United States Patent
Bergström et al.

(10) Patent No.: US 8,588,172 B2
(45) Date of Patent: *Nov. 19, 2013

(54) METHODS AND NETWORK NODES THAT SIMULTANEOUSLY ASSIGN TEMPORARY BLOCK FLOWS FOR UPLINK AND DOWNLINK COMMUNICATION CHANNELS TO A MOBILE STATION

(75) Inventors: Andreas Bergström, Vikingstad (SE); Håkan Axelsson, Linköping (SE); Paul Schliwa-Bertling, Ljungsbro (SE)

(73) Assignee: Telefonaktiebolaget L M Ericsson (pub), Stockholm (SE)

( * ) Notice: Subject to any disclaimer, the term of this patent is extended or adjusted under 35 U.S.C. 154(b) by 407 days.

This patent is subject to a terminal disclaimer.

(21) Appl. No.: 12/812,929

(22) PCT Filed: Oct. 29, 2008

(86) PCT No.: PCT/SE2008/051227
§ 371 (c)(1), (2), (4) Date: Jul. 14, 2010

(87) PCT Pub. No.: WO2009/102252
PCT Pub. Date: Aug. 20, 2009

(65) Prior Publication Data
US 2011/0116368 A1    May 19, 2011

Related U.S. Application Data

(60) Provisional application No. 61/029,045, filed on Feb. 15, 2008.

(51) Int. Cl.
*H04W 4/00* (2009.01)

(52) U.S. Cl.
USPC ........... 370/330; 370/329; 370/437; 455/509; 455/510

(58) Field of Classification Search
None
See application file for complete search history.

(56) References Cited

U.S. PATENT DOCUMENTS

| | | | | |
|---|---|---|---|---|
| 8,320,312 B2 * | 11/2012 | Olsson et al. | ................. | 370/329 |
| 2002/0080758 A1 * | 6/2002 | Landais | ........................ | 370/338 |
| 2002/0105943 A1 * | 8/2002 | Womack et al. | .............. | 370/352 |
| 2003/0076812 A1 * | 4/2003 | Benedittis | ..................... | 370/350 |
| 2006/0221896 A1 * | 10/2006 | Vaittinen et al. | .............. | 370/328 |
| 2008/0151828 A1 * | 6/2008 | Bjorken et al. | ................ | 370/329 |
| 2010/0080125 A1 * | 4/2010 | Olsson et al. | ................. | 370/235 |

FOREIGN PATENT DOCUMENTS

WO    WO 2008/041941 A1    4/2008

OTHER PUBLICATIONS

International Search Report; PCT/SE2008/051227; May 20, 2009.
International Preliminary Report on Patentability; PCT/SE2008/051227; May 21, 2010.

(Continued)

*Primary Examiner* — Donald Mills
(74) *Attorney, Agent, or Firm* — Myers Bigel Sibley & Sajovec, P.A.

(57) ABSTRACT

A method of accessing a communications channel, the method comprising: assigning a time transmission interval (TTI) and at least one temporary block flow (TBF) during an Access Grant Channel (AGCH) assignment; allocating an additional field in an Immediate Assignment message sent on the AGCH; using the additional field to simultaneously assign to a mobile station (MS) at least one temporary block flow on an uplink of the communications channel and at least one temporary block flow on a downlink of the communications channel.

20 Claims, 3 Drawing Sheets

(56) References Cited

OTHER PUBLICATIONS

Ericsson; "GERAN continued evolution"; 3GPP Draft; GP-050977; 3$^{rd}$ Generation Partnership Project (3GPP); Mobile Competence Centre; 650; Route des Lucioles; F-06921 Sophia-Antipolis Cedex; France; No. Dublin; 2050404; Apr. 2, 2005; XP050013755; chapter 3.6.

3GPP: "3GPP TS 44.018 V8.1.0; 3$^{rd}$ Generational Partnership Project; Technical Specification Group GSM/EDGE Radio Access Network; Mobile radio interface layer 3 specification; Radio Resource Control (RRC) protocol (Release 8))" Dec. 2007; 3$^{rd}$ Generation Partnership Project (Sophia-Antipolis Cedex; France; XP002526096, Chapters 3.3.1.1.2, 3.3.1.1.3, 9.1.18, 9.1.19, 3.5.2, 3.5.2.1.3, 3.5.3.

3GPP: "3GPP TS 44.060 V7.11.0; 3$^{rd}$ Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7))" Dec. 2007, 3$^{rd}$ Generation Partnership Project (3GPP); Sophia-Antipolis Cedex; France, XP002526097, Chapters 8.1, 8.1.0, 8.1.1, 8.1.1.1.1, 8.1.1.2.2.

Cai et al. "General Packet Radio Service in GSM" *IEEE Communications Magazine* 35(10):122-132, XP000723984.

International Search Report; PCT/SE2008/051227; May 20, 2009, 3 pp.

International Preliminary Report on Patentability; PCT/SE2008/051227; May 21, 2010, 6 pp.

Ericsson; "GERAN continued evolution"; 3GPP Draft; GP-050977; 3$^{rd}$ Generation Partnership Project (3GPP); Mobile Competence Centre; 650; Route des Lucioles; F-06921 Sophia-Antipolis Cedex; France; No. Dublin; 2050404; Apr. 2, 2005; XP050013755; chapter 3.6, 6 pp., entire document submitted.

3GPP: "3GPP TS 44.018 V8.1.0; 3$^{rd}$ Generational Partnership Project; Technical Specification Group GSM/EDGE Radio Access Network; Mobile radio interface layer 3 specification; Radio Resource Control (RRC) protocol (Release 8))" Dec. 2007; 3$^{rd}$ Generation Partnership Project (Sophia-Antipolis Cedex; France; XP002526096, Chapters 3.3.1.1.2, 3.3.1.1.3, 9.1.18, 9.1.19, 3.5.2, 3.5.2.1.3, 3.5.3, 36 pp., entire document submitted.

3GPP: "3GPP TS 44.060 V7.11.0; 3$^{rd}$ Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7))" Dec. 2007, 3$^{rd}$ Generation Partnership Project (3GPP); Sophia-Antipolis Cedex; France, XP002526097, Chapters 8.1, 8.1.0, 8.1.1, 8.1.1.1.1, 8.1.1.2.2, 32 pp., entire document submitted.

Cai et al. "General Packet Radio Service in GSM" *IEEE Communications Magazine* 35(10):122-131, Oct. 1997, XP000723984.

\* cited by examiner

METHODS AND NETWORK NODES THAT SIMULTANEOUSLY ASSIGN TEMPORARY BLOCK FLOWS FOR UPLINK AND DOWNLINK COMMUNICATION CHANNELS TO A MOBILE STATION

CROSS REFERENCE TO RELATED APPLICATIONS

This application is a 35 U.S.C. §371 national stage application of PCT International Application No. PCT/SE2008/051227, filed on 29 Oct. 2008, which itself claims priority to U.S. provisional patent Application No. 61/029,045, filed 15 Feb. 2008, the disclosure and content of both of which are incorporated by reference herein in its entirety. The above-referenced PCT International Application was published in the English language as International Publication No. WO 2009/102252 A1 on 20 Aug. 2009.

TECHNICAL FIELD

The present invention relates to a method and arrangement in a telecommunication system, in particular a method and arrangement for simultaneous temporary block flow (TBF) setup in uplink and downlink directions.

BACKGROUND

Enhanced Data GSM Environment (EDGE) is a wireless Third Generation (3G) technology that allows an increase in data transmission rate and improves data transmission reliability. EDGE can be used for any packet switched application such as an Internet connection. EDGE is implemented as an add-on enhancement to 2G and 2.5G Global System for Mobile Communications (GSM) and General Packet Radio Service (GPRS) networks, making it easier for existing GSM carriers to upgrade to it.

In the continuing evolution of the 3G standard, Wideband Code Division Multiple Access (WCDMA) has been developed. More technically, WCDMA is a wideband spread-spectrum mobile air interface that utilizes the direct sequence Code Division Multiple Access (CDMA) signaling method to achieve higher speeds and support more users compared to the implementation of time division multiplexing (TDMA) used by 2G GSM networks. WCDMA has been developed into a complete set of specifications, a detailed protocol that defines how a mobile phone communicates with the tower, how signals are modulated, how datagrams are structured, and system interfaces are specified allowing free competition on technology elements.

With Enhanced Data GSM Environment (EDGE) Continued Evolution work in the Third Generation Partnership Project (3GPP) one aim is to improve the seamless workability between WCDMA and EDGE. One main target is reduced latency, which is very beneficial for applications like Voice Over Internet Protocol (VoIP), Push-to-talk over cellular (PoC) and Mobile TV and Gaming.

In a conventional system, the mobile station (MS) is capable of indicating to the radio access network (RAN) that it can handle more than 1 time slot (TS) in the uplink, however the RAN is restricted by the current 3GPP standard to assigning only 1TS for an uplink TBF in one direction, and when the RAN finds out that transmission in the other direction is necessary, assigns another TBF in the other direction. Therefore, once the RAN finds out about the MS capabilities, either during the second phase of a two phase access or by querying the Serving GPRS Support Node (SGSN) for this information for the case of a one phase access. The result of this is a slower ramp-up in throughput and an increased delay. This restriction increases the initial delay for services like VoIP and Push-to-talk (PoC) and Mobile TV and Gaming. Since almost all transactions are bi-directional, this sequential approach adds unnecessary delays and protocol overhead.

Any discussion of documents, acts or knowledge in this specification is included to explain the context of the invention. It should not be taken as an admission that any of the material forms part of the prior art base or the common general knowledge in the relevant art.

SUMMARY

According to a first aspect, the present invention provides a method of accessing a communications channel, the method comprising: assigning a time transmission interval (TTI) and at least one temporary block flow (TBF) during a Access Grant Channel (AGCH) assignment; allocating an additional field in an Immediate Assignment message sent on the AGCH; using the additional field to simultaneously assign to a mobile station (MS) at least one temporary block flow on an uplink of the communications channel and at least one temporary block flow on a downlink of the communications channel.

Assigning a Downlink and an Uplink TBF in one, initial message, during a One Phase Access, will significantly reduce the delay for the initial communication setup. This invention will reduce delay in access and setup phase by one round-trip time. This round-trip time will be noticeable to the end-users in many applications and services, such as VoIP and Push-to-talk and Mobile TV.

The communications channel may comprise any system which requires a bi-directional flow on a channel. The communications channel may comprise any one of a Wideband Code Division Multiplex Access (WCDMA) system, an Enhanced Data GSM Environment (EDGE) system or a Long Term Evolution (LTE) system. The time transmission interval (TTI) may be either a reduced time transmission interval (RTTI) or a basic time transmission interval (BTTI). The allocating of the additional field in an immediate assignment message may be achieved by changing various information elements (IEs) in either the Packet Channel Description IE or the EGPRS Packet Uplink Assignment. The Immediate Assignment message sent on the AGCH may comprise one message to assign TBFs in both directions on a bi-directional Packet Associated Control Channel (PACCH). The Immediate Assignment message sent on the AGCH may comprise one message to assign TBFs in both directions on a bi-directional Packet Broadcast Control Channel (PBCCH). The Immediate Assignment message may be a Multislot Immediate Assignment message. The assigning of the reduced time transmission interval (RTTI) and the at least one temporary block flow (TBF) during an Access Grant Channel (AGCH) may be performed by a Radio Access network (RAN).

The present invention will also decrease signaling load on the PACCH, since only one message is needed to setup TBFs in both directions. Almost all packet data sessions are bi-directional and thus require TBFs in both directions. Lower signaling load means higher timeslot utilization for user data, which increases hardware utilization.

According to a further aspect, the present invention provides a network node for accessing a communications channel, the node comprising: means for assigning a time transmission interval (TTI) and at least one temporary block flow (TBF) during a Access Grant Channel (AGCH) assignment; means for introducing a field in an Immediate Assignment message sent on the AGCH so as to simultaneously allocate to a mobile station (MS) at least one temporary block flow on an uplink of the communications channel and at least one temporary block flow on a downlink of the communications channel.

The communications channel may comprise any system which requires a bi-directional flow on a channel. The communications channel may comprise any one of a Wideband Code Division Multiplex Access (WCDMA) system, an Enhanced Data GSM Environment (EDGE) system. or a Long Term Evolution (LTE) system. The time transmission interval (TTI) may be either a reduced time transmission interval (RTTI) or a basic time transmission interval (BTTI). The allocating of the additional field in an immediate assignment message may be achieved by changing various information elements (IEs) in either the Packet Channel Description IE or the EGPRS Packet Uplink Assignment. The means for assigning the reduced time transmission interval (RTTI) and the at least one temporary block flow (TBF) during an Access Grant Channel (AGCH) may be performed by a Radio Access network (RAN). The Immediate Assignment message sent on the AGCH may comprise one message to assign TBFs in both directions on a bi-directional Packet Associated Control Channel (PACCH). The Immediate Assignment message sent on the AGCH may comprise one message to assign TBFs in both directions on a bi-directional Packet Broadcast Control Channel (PBCCH). The Immediate Assignment message may be a Multislot Immediate Assignment message.

The various features of novelty which characterize the present invention are pointed out with particularity in the claims annexed to and forming part of this disclosure. For a better understanding of the present invention, its operation and advantages attained by its use, reference should be had to the accompanying drawings and descriptive matter in which preferred embodiments of the invention are illustrated and described.

DETAILED DESCRIPTION

The present invention will be discussed hereinafter in detail in terms of the preferred embodiment of a method and arrangement for accessing a communications channel. In the following description, numerous specific details are set forth in order to provide a thorough understanding of the present invention. It will be obvious, however, to those skilled in the art that the present invention may be practiced without these specific details.

Figure 1:
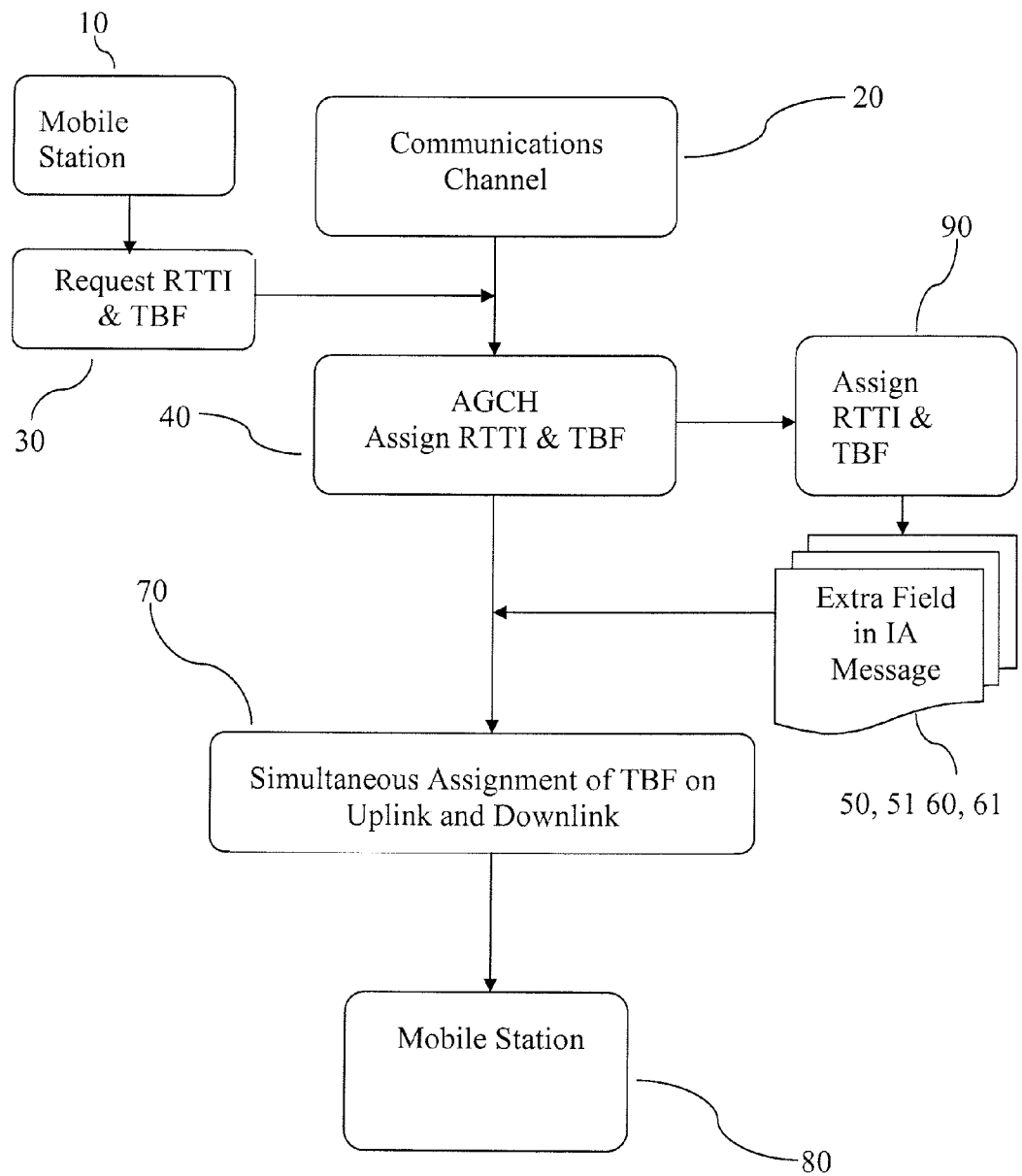
FIG. 1 shows a flow chart illustrating the method in accordance with an embodiment of the present invention.
Figure 3:
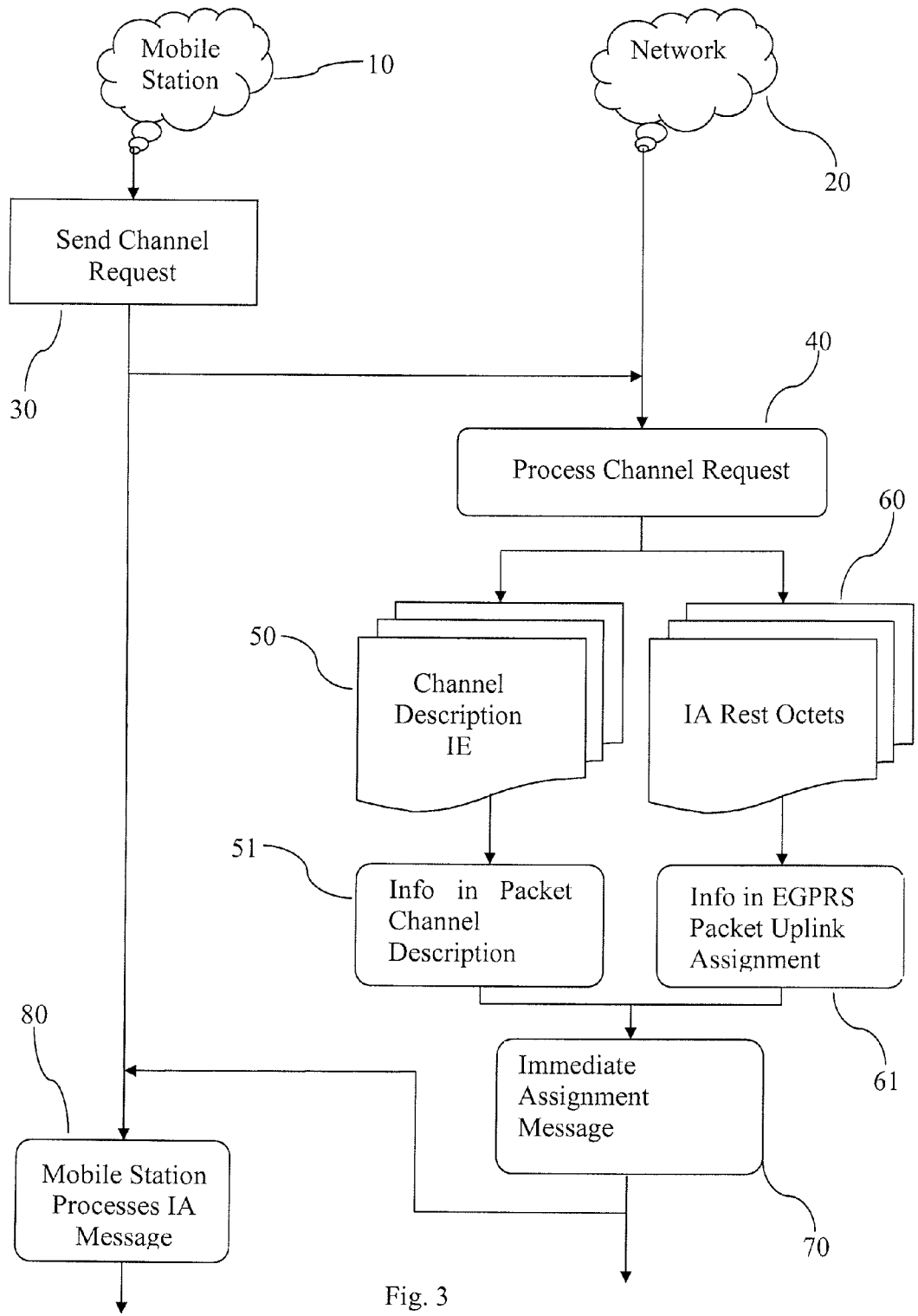
FIG. 3 shows a detailed flow chart illustrating the method in accordance with an embodiment of the present invention.

FIGS. 1 and 3 show flow charts illustrating the method in accordance with an embodiment of the present invention. The bi-directional immediate assignments of a temporary block flow (TBF) 90 is achieved by modifying some of the information elements (IE) in the current Immediate Assignment message 70 sent on Access Grant Channel (AGCH) 40 to assign the mobile station (MS) 10 one uplink and one downlink TBF simultaneously. A TBF 90 is a physical connection used by two radio resource (RR) entities to support the uni-directional transfer of logical link control (LLC) protocol data unit (PDU) on packet data channels (PDCH).

This Immediate Assignment message 70 is described in sub-clause 9.1.18 of 3GPP TS 44.018 v8.1.0; "Mobile radio interface layer 3 specification; Radio Resource Control (RRC) protocol", and contains several information elements (IE). The Immediate Assignment message 70 may also consist of a multislot Immediate Assignment message 70.

W-CDMA is a wideband spread-spectrum mobile air interface that utilizes the direct-sequence spread spectrum method of asynchronous code division multiple access to achieve higher speeds and support more users. Typically, W-CDMA transmits on a pair of 5 MHz-wide radio channels, and as described above has been developed into a complete set of specifications, a detailed protocol that defines how a mobile phone communicates with the tower, how signals are modulated, how datagrams are structured, and system interfaces are specified allowing free competition on technology elements.

By simultaneously assigning a downlink and an uplink TBF 90 in one, initial message, during a one phase access, significantly reduces the delay for the initial communication setup. In order to reduce the delay in accessing a communications channel 20 a time transmission channel (TTI) and at least one temporary block flow (TBF) 90 are assigned during an access grant channel (AGCH) assignment 40. The TTI can be either a reduced time transmission interval (RTTI) or a basic time transmission interval (BTTI).

Figure 2:
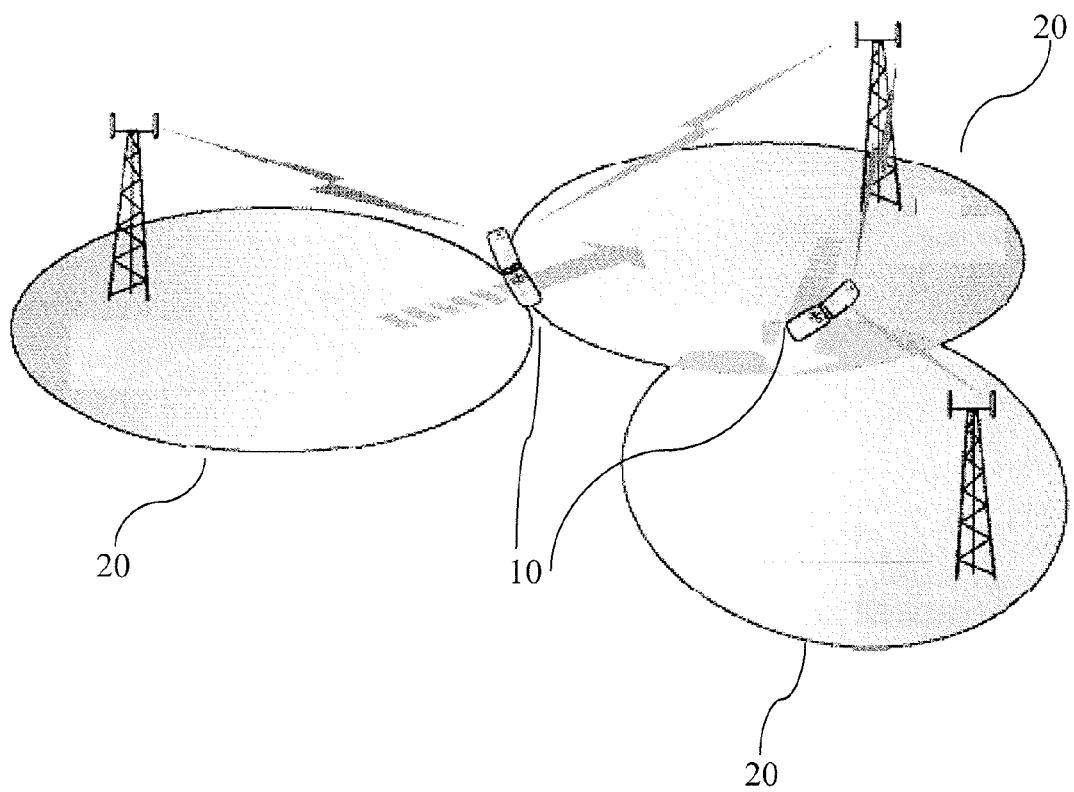
FIG. 2 shows a schematic of the communication channels according to one embodiment of the present invention.

FIG. 2 shows two different communication channels 20 used to communicate with a mobile station 10 which are capable of being used in a communications network. WCDMA as described above and enhanced data GSM environment (EDGE) are two such communication channels 20, however it should be noted that any communication channel which requires a bi-directional flow could be used. For example, other communication channels such as Long Term Evolution (LTE) can be used without departing from the scope of the invention.

The AGCH 40 is typically used to assign resources to a user requesting access to a network. The reduced time transmission interval (RTTI) is a parameter related to digital telecommunication networks, and is related to encapsulation of data from higher layers into frames for transmission on the radio link layer. RTTI refers to the length of an independently decodable transmission on the radio link and is also related to the size of the data blocks passed from the higher network layers to the radio link layer. To combat errors due to fading and interference on the radio link, data is divided at the transmitter into blocks and then the bits within a block are encoded and interleaved. The length of time required to transmit one such block determines the RTTI.

Once a reduced time transmission channel (RTTI) and at least one temporary block flow (TBF) 90 have been assigned during an access grant channel (AGCH) assignment 40, an additional field is then allocated in an immediate assignment message 70 to be sent on the AGCH 40. It is also possible to use a Radio Access Network (RAN) to assign the RTTI and the at least one TBF during the AGCH.

The additional field which is allocated is used to simultaneously assign to a mobile station 10 at least one TBF 90 on an uplink of the communications channel 20 and at least one TBF 90 on a downlink of the communications channel 20. The immediate assignment message 70 may also consist of a single message which is used to assign TBFs in both directions on a bi-directional Packet Associated Control Channel (PACCH) or a bi-directional Packet Broadcast Control Channel (PBCCH).

The additional field in an immediate assignment message 70 can be achieved by changing various information elements. In one example embodiment two of the information elements which are allocated, namely the Packet Channel Description IE 50, 51 and the IA Rest Octets 60, 61. However it should be noted that the current invention is not restricted to only these information elements.

For the Packet Channel Description IE 50, 51, which is defined in sub-clause 10.5.2.25a of 3GPP TS 44.018 v8.1.0; "Mobile radio interface layer 3 specification; Radio Resource Control (RRC) protocol", the proposal is to introduce an escape sequence for reduced time transmission interval (RTTI) or basic time transmission interval (BTTI) change. Within this part of the modified message new fields are introduced where at least one and maximum two uplink packet data channel (PDCH) pairs are specified. As an option, a maximum of two downlink PDCH pairs may also be specified. The total size of the Packet Channel Description IE 50, 51 will not be affected by the proposed changes.

As an example the modified Packet Channel Description IE 50, 51 could look as follows, where the introduced changes are indicated by bold font:

Here, the added information field PRIMARY UPLINK PDCH PAIR TN field (3 bit) is the binary representation of the timeslot with the lowest timeslot number (TN) constituting the assigned primary uplink PDCH pair(s). Note that it is always assumed that the timeslots are consecutive for all PDCH pairs.

The NUMBER OF UPLINK PDCH PAIRS field (2 bit) is the binary representation of the number of allocated uplink PDCH pairs. A minimum of one and a maximum of two uplink PDCH pairs may be allocated. If two PDCH pairs are allocated then the second pair is denoted secondary PDCH pair.

The NUMBER OF DOWNLINK PDCH PAIRS field (2 bit) is the binary representation of the number of allocated downlink PDCH pairs. None, one or two downlink PDCH pairs may be allocated. The notation of primary and secondary PDCH pair is used also for the downlink PDCH pairs.

For the IA Rest Octets 60, 61, which are defined in sub-clause 10.5.2.16 of 3GPP TS 44.018 v8.1.0; "Mobile radio interface layer 3 specification; Radio Resource Control (RRC) protocol", the proposal is to add the some of the optional Rel-7 fields to the Enhanced General Packet Radio Service (EGPRS) Packet Uplink Assignment message. These include:

the possibility to assign an uplink EGPRS RTTI TBF;
optionally, the possibility to simultaneously assign a simultaneous downlink EGPRS RTTI TBF;
an indication of whether BTTI or RTTI USF mode is used;
information if Extended Dynamic Allocation is used;
the USF values that are required to operate using BTTI USF mode and/or more than one uplink PDCH pair;
the power control parameters that are required if assigning more than one uplink PDCH pair;
information of whether Event-Based FANR shall be used for the uplink TBF; and
information of whether the SSN-based or Time-Based approach will be used for a possible downlink TBF.

By way of an example the modified EGPRS Packet Uplink Assignment message 60, 61 could then look as below; where again the changes related to the invention are highlighted using bold text:

```
< Packet Channel Description > ::=
    {0< Channel type : bit (4) >    -- BTTI mode escape sequence
                            < TN : bit (3) >
                    | 1 < PRIMARY UPLINK PDCH PAIR TN : bit(3) > --
RTTI configuration escape sequence
                            < NUMBER OF UPLINK PDCH PAIRS : bit(2) >
                            < NUMBER OF DOWNLINK PDCH PAIRS:-bit(2) >
    }
                    < TSC : bit (3) >
                    {  0
                    {  0   < spare bit >
                            < ARFCN : bit (10) > -- non-hopping RF channel
configuration
                        | 1 < spare bit >
                            < MAIO : bit (6) >   -- indirect encoding of hopping RF
channel configuration
                            < MA_NUMBER_IND : bit >
                            {  0 < spare bits : bit (2) >
                                | 1 < CHANGE_MARK_1 : bit (2) > }
                    }
                    |1
                    < MAIO : bit (6) >-- direct encoding of hopping RF channel
configuration
                    < HSN : bit (6) >
        };
```

```
< EGPRS Packet Uplink Assignment > : :=
< Extended RA : bit (5) >
{ 0 | 1    < Access Technologies Request : Access Technologies Request
struct > }
{         1    < TFI_ASSIGNMENT : bit (5) >
               < POLLING : bit >
               0         -- The value '1' was allocated in an earlier version of
the protocol and shall not be used.
               < USF: bit (3) >
               < USF_GRANULARITY : bit >
               { 0 | 1    < P0 : bit (4) >
                          < PR_MODE : bit (1) > }
               < EGPRS CHANNEL_CODING_COMMAND : < EGPRS
Modulation and Coding IE >>
               < TLLI_BLOCK_CHANNEL_CODING : bit (1) >
               { 0 | 1 < BEP_PERIOD2 : bit (4) > }
               < RESEGMENT : bit (1) >
               < EGPRS Window Size : < EGPRS Window Size IE >>
               { 0 | 1    < ALPHA : bit (4) > }
                          < GAMMA : bit (5) >
               { 0 | 1    < TIMING_ADVANCE_INDEX : bit (4) > }
               { 0 | 1    < TBF_STARTING_TIME : bit (16) > }
               {  null | L      -- Receiver compatible with earlier
release
                | H              -- Additions for Rel-7
                       < RTTI_USF_MODE : bit(1) >
                       <  EXTENDED_DYNAMIC_ALLOCATION : bit
(1)>
                       <ADDITIONAL USF : Additional USF struct >
                       <SECONDARY GAMMA : bit(5) > * (val
(NUMBER OF UPLINK PDCH PAIRS) - 1)
                       { 0 | 1 < DOWNLINK_TFI_ASSIGNMENT : bit (5)
> -- Optional simultaneous    < EVENT_BASED_FANR: bit (1) >
-- assignment of a downlink TBF
                       }
                       { 0   -- SSN-based approach is used
                        | 1   -- Time-based approach is used
                           < REPORTED TIMESLOTS : bit (8) >
                           < TSH : bit (2) >
                       }
                }
0                              -- Multi Block Allocation
               { 0 | 1    < ALPHA : bit (4) > }
                          < GAMMA : bit (5) >
                          < TBF_STARTING_TIME : bit (16) >
                          < NUMBER OF RADIO BLOCKS ALLOCATED : bit
(2) >
               { 0 | 1    < P0 : bit (4) >
                          0  -- The value '1' was allocated in an earlier version of
the protocol and shall not be used.
                          < PR_MODE : bit (1) > }
               {  null | L  -- Receiver compatible with earlier release
                 | H  - - Additions for Rel-6
                       {0 | 1< PFI : bit (7) > }
               }
} ;
```

The added information field RTTI USF Mode (1 bit field) identifies whether RTTI or BTTI USF Mode is enabled for this uplink RTTI TBF.

EXTENDED_DYNAMIC_ALLOCATION (1 bit field) indicates whether Extended Dynamic Allocation is used.

The ADDITIONAL USF is a construction that is used to assign additional USF values which are needed in the some cases. The USF values should be assigned to the PDCH pairs in the following order: First to the primary uplink PDCH pair defined as indicated in the preceding Packet Channel Description. Secondly (if applicable) to the secondary uplink PDCH pair as indicated in the preceding Packet Channel Description.

The SECONDARY GAMMA field provides an additional GAMMA value which is used only in the case when two uplink PDCH pairs are assigned for RTTI configuration.

The DOWNLINK TFI_ASSIGNMENT field (5 bit field) is the binary representation of the Temporary Flow Identity for the downlink TBF.

EVENT_BASED_FANR (1 bit field) indicates whether the event-based FANR is enabled for the downlink TBF.

REPORTED TIMESLOTS (8 bit field) indicates the timeslots for which feedback is provided by a time-based encoded PAN field.

TSH (2 bit field) indicates the time-shift between the most recent radio block period for which feedback information is provided and the radio block period when the bitmap is sent.

When these optional Rel-7 fields are left unused, the total size of the EGPRS Packet Uplink Assignment and thus the IA Rest Octets 60, 61 will be unaffected. When used however, additional bits are required and the size of the EGPRS Packet Uplink Assignment message will however increase. How much depends upon the configuration, i.e. how many and which of the optional fields that are used.

As shown above the present invention will also decrease signaling load on the PACCH, since only one message is needed to setup TBFs 90 in both directions. Almost all packet data sessions are bi-directional and thus require TBFs 90 in both directions. Lower signaling load means higher timeslot utilization for user data, which increases hardware utilization.

The method according to the present invention can be utilised in a communications network in which a network node is used to access a communications channel 20. Typically the network node and the communications network will include a bi-directional immediate assignment message used to assign a temporary block flow (TBF) 90 is by modifying some of the information elements (IE) in the current Immediate Assignment message 70 sent on Access Grant Channel (AGCH) 40 to assign the mobile station (MS) 10 one uplink and one downlink TBF simultaneously.

By simultaneously assigning a downlink and an uplink TBF 90 in one, initial message, during a one phase access, the network node significantly reduces the delay for the initial communication setup. In order to achieve the reduction the delay a means for assigning a reduced time transmission interval (RTTI) or a basic time transmission interval (BTTI) and at least one temporary block flow (TBF) 90 are assigned during an access grant channel (AGCH) assignment 40. The means for assigning the RTTI or BTTI may include a connection control device being a set of logic in a packet control unit (PCU) in the base station controller (BSC).

Once a network node has assigned reduced time transmission channel (RTTI) and at least one temporary block flow (TBF) 90, a separate means also a connection control device as described above is used to add an additional field which is then allocated in an immediate assignment message 70 to be sent on the AGCH 40. It is also possible to use a Radio Access Network (RAN) to assign the RTTI and the at least one TBF during the AGCH.

The additional field which is allocated is used to simultaneously assign to a mobile station 10 at least one TBF 90 on an uplink of the communications channel 20 and at least one TBF 90 on a downlink of the communications channel 20. The immediate assignment message 70 may also consist of a single message which is used to assign TBFs in both directions on a bi-directional Packet Associated Control Channel (PACCH).

Although the present invention has been illustrated and described with respect to exemplary embodiment thereof, it should be understood by those skilled in the art that the foregoing and various other changes, omission and additions may be made therein and thereto, without departing from the scope of the invention. Therefore the present invention should not be understood as limited to the specific embodiment set out above but to include all possible embodiments which can be embodied within a scope encompassed and equivalent thereof with respect to the features set out in the appended claims.

The invention claimed is:

1. A method by a network node of accessing a communications channel, the method comprising:
    assigning, by the network node, a time transmission interval (TTI) and at least one temporary block flow (TBF) during an Access Grant Channel (AGCH) assignment;
    allocating, by the network node, an additional field in an Immediate Assignment message sent on the AGCH by changing information elements in the Packet Channel Description Information Element (IE); and
    using the additional field to simultaneously assign to a mobile station (MS) at least one temporary block flow on an uplink of the communications channel and at least one temporary block flow on a downlink of the communications channel,
    wherein the Packet Channel Description IE of the Immediate Assignment message sent on the AGCH comprises one message commanding assignment of TBFs in both directions simultaneously on a bi-directional Packet Associated Control Channel (PACCH).

2. The method according to claim 1, wherein the communication channel includes any system which requires a bi-directional flow on a channel.

3. The method according to claim 2, wherein the communications channel includes any one of a Wideband Code Division Multiplex Access (WCDMA) system, a Enhanced Data GSM Environment (EDGE) system or a Long Term Evolution (LTE) system.

4. The method according to claim 1, wherein the time transmission interval (TTI) comprises either a reduced time transmission interval (RTTI) or a basic time transmission interval (BTTI).

5. The method according to claim 1, wherein the allocating of the additional field in an immediate assignment message comprises changing information elements in either the Packet Channel Description Information Element (IE) or the Enhanced General Packet Radio Service (EGPRS) Packet Uplink Assignment.

6. The method according to claim 1, wherein the Immediate Assignment message sent on the AGCH comprises one message to assign TBFs in both directions on a bi-directional Packet Broadcast Control Channel (PBCCH).

7. The method according to claim 1, wherein the Immediate Assignment message is a Multislot Immediate Assignment message.

8. The method according to claim 1, wherein:
    the time transmission interval (TTI) comprises a reduced time transmission interval (RTTI); and
    the assigning of the reduced time transmission interval (RTTI) and the at least one temporary block flow (TBF) during an Access Grant Channel (AGCH) is performed by a Radio Access network (RAN).

9. The method of claim 1, wherein allocating further comprises specifying at least one uplink packet data channel (PDCH) pair in the Packet Channel Description IE to introduce an escape sequence for reduced time transmission interval (RTTI) or basic time transmission interval (BTTI) change.

10. The method of claim 9, wherein allocating further comprises specifying at least one downlink PDCH pair.

11. A network node for accessing a communications channel, the node comprising:
    a connection control device that is configured to assign a time transmission interval (TTI) and at least one temporary block flow (TBF) during an Access Grant Channel (AGCH) assignment, and configured to introduce a field by changing information elements in the Packet Channel Description Information Element (IE) in an Immediate Assignment message sent on the AGCH to simultaneously allocate to a mobile station (MS) at least one temporary block flow on an uplink of the communications channel and at least one temporary block flow on a downlink of the communications channel,
    wherein the Packet Channel Description IE of the Immediate Assignment message sent on the AGCH comprises one message commanding assignment of TBFs in both directions on a bi-directional Packet Associated Control Channel (PACCH).

12. The node according to claim 11, wherein the communication channel includes any system which requires a bi-directional flow on a channel.

13. The node according to claim 12, wherein the communications channel includes any one of a Wideband Code Division Multiplex Access (WCDMA) system, an Enhanced Data GSM Environment (EDGE) system or a Long Term Evolution (LTE) system.

14. The node according to claim 11, wherein the time transmission interval (TTI) comprises either a reduced time transmission interval (RTTI) or a basic time transmission interval (BTTI).

15. The node according to claim 11, wherein the allocating of the additional field in an immediate assignment message comprises changing information elements in the Enhanced General Packet Radio Service (EGPRS) Packet Uplink Assignment.

16. The node according to claim 11, wherein the Immediate Assignment message sent on the AGCH comprises one message to assign TBFs in both directions on a bi-directional Packet Broadcast Control Channel (PBCCH).

17. The node according to claim 11, wherein the Immediate Assignment message is a Multislot Immediate Assignment message.

18. The node according to claim 11, wherein the connection control device is within a Radio Access network (RAN).

19. A method by a network node of accessing a communications channel, the method comprising:

assigning, by the network node, a time transmission interval (TTI) and at least one temporary block flow (TBF) during an Access Grant Channel (AGCH) assignment;

allocating, by the network node, an additional field in an Immediate Assignment message sent on the AGCH by changing information elements in the IA Rest Octets; and using the additional field to simultaneously assign to a mobile station (MS) at least one temporary block flow on an uplink of the communications channel and at least one temporary block flow on a downlink of the communications channel, wherein the IA Rest Octets of the Immediate Assignment message sent on the AGCH comprise one message commanding assignment of TBFs in both directions simultaneously on a bi-directional Packet Associated Control Channel (PACCH).

20. The method of claim 19, wherein allocating further comprises adding optional Rel-7 fields to the EGPRS Packet Uplink Assignment.

* * * * *

UNITED STATES PATENT AND TRADEMARK OFFICE
CERTIFICATE OF CORRECTION

PATENT NO. : 8,588,172 B2  Page 1 of 1
APPLICATION NO. : 12/812929
DATED : November 19, 2013
INVENTOR(S) : Bergstrom et al.

It is certified that error appears in the above-identified patent and that said Letters Patent is hereby corrected as shown below:

In the Specification

In Column 1, Line 51, delete "multiplexing" and insert -- multiple access --, therefor.

In Column 2, Line 50, delete "Multiplex" and insert -- Multiple --, therefor.

In Column 3, Line 24, delete "Multiplex" and insert -- Multiple --, therefor.

In Column 3, Lines 66-67, delete "invention;" and insert -- invention. --, therefor.

In the Claims

In Column 10, Line 15, in Claim 3, delete "Multiplex" and insert -- Multiple --, therefor.

In Column 11, Line 6, in Claim 13, delete "Multiplex" and insert -- Multiple --, therefor.

Signed and Sealed this
Thirteenth Day of May, 2014

Michelle K. Lee
*Deputy Director of the United States Patent and Trademark Office*